(12) United States Patent
Yamada et al.

(10) Patent No.: US 9,885,612 B2
(45) Date of Patent: Feb. 6, 2018

(54) OPTICAL TEMPERATURE SENSOR AND METHOD OF CONTROLLING SAME

(71) Applicant: Tokyo Electron Limited, Tokyo (JP)

(72) Inventors: Kenichiro Yamada, Miyagi (JP); Takari Yamamoto, Miyagi (JP)

(73) Assignee: Tokyo Electron Limited, Tokyo (JP)

( * ) Notice: Subject to any disclaimer, the term of this patent is extended or adjusted under 35 U.S.C. 154(b) by 82 days.

(21) Appl. No.: 14/804,557

(22) Filed: Jul. 21, 2015

(65) Prior Publication Data

US 2016/0033335 A1 Feb. 4, 2016

(30) Foreign Application Priority Data

Jul. 29, 2014 (JP) .................................. 2014-153893

(51) Int. Cl.
*G01J 5/08* (2006.01)
*G01J 5/58* (2006.01)

(52) U.S. Cl.
CPC ............... *G01J 5/0896* (2013.01); *G01J 5/58* (2013.01)

(58) Field of Classification Search
CPC .............................. G01K 11/12; G01J 1/1626
See application file for complete search history.

(56) References Cited

U.S. PATENT DOCUMENTS

2014/0158872 A1* 6/2014 Kallendrusch ......... A61B 18/22
250/227.23

FOREIGN PATENT DOCUMENTS

| JP | S62-118227 | 5/1987 |
| JP | H06-137965 | 5/1994 |

* cited by examiner

*Primary Examiner* — Tony Ko
(74) *Attorney, Agent, or Firm* — IPUSA, PLLC

(57) ABSTRACT

An optical temperature sensor includes an light-emitting-side measurement unit to measure a first light intensity of a measuring beam and a second light intensity of a reference beam, and a light-receiving-side measurement unit to measure a third light intensity of a first reflected beam of the measuring beam and a fourth light intensity of a second reflected beam of the reference beam. The optical temperature sensor further includes a control unit to adjust at least one of a first control target value of the first light intensity and a second control target value of the second light intensity based on at least one of the third light intensity and the fourth light intensity. The control unit controls at least one of the first light intensity and the second light intensity based on the adjusted at least one of the first and second control target values.

10 Claims, 7 Drawing Sheets

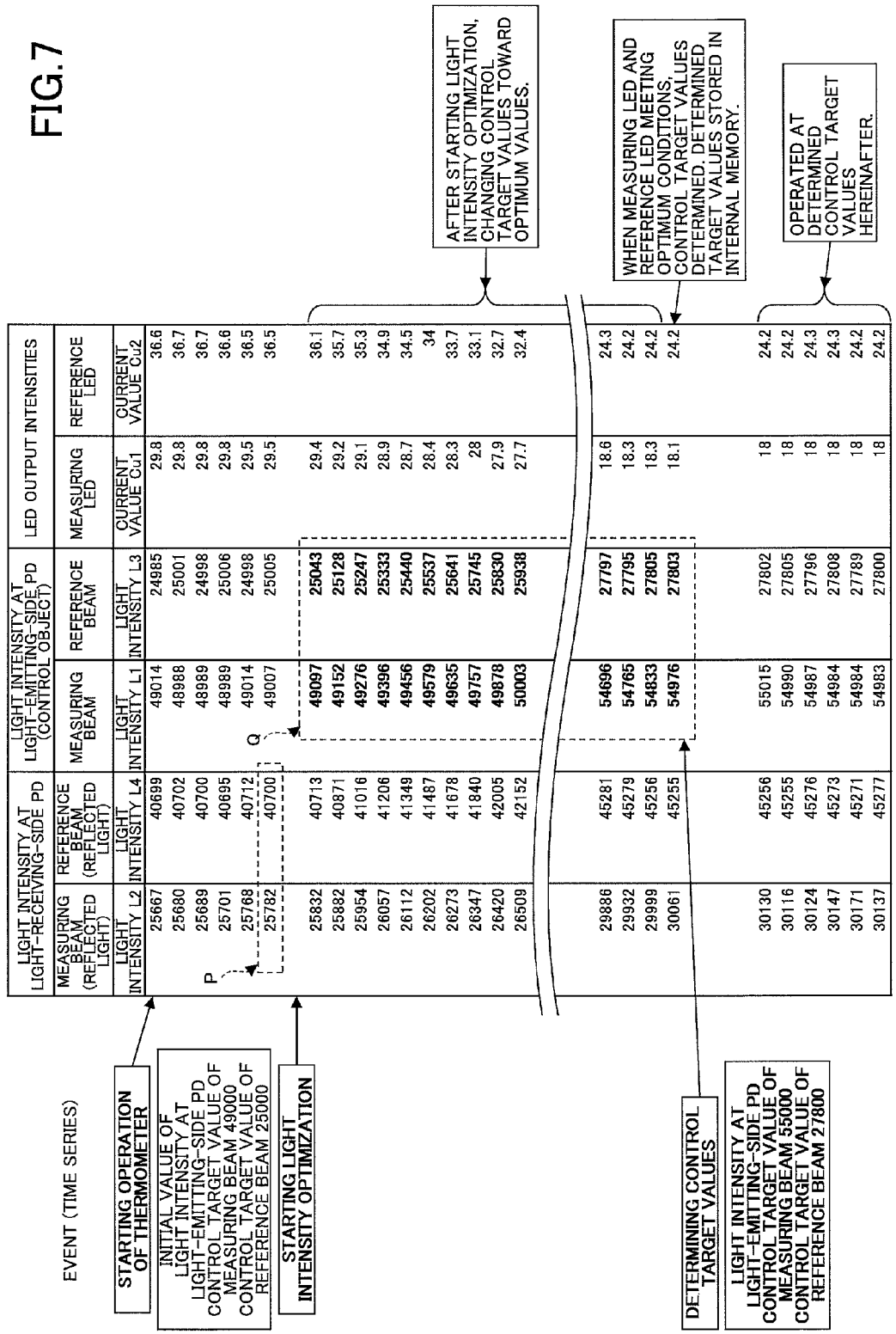

OPTICAL TEMPERATURE SENSOR AND METHOD OF CONTROLLING SAME

CROSS-REFERENCE TO RELATED APPLICATIONS

This patent application is based upon and claims the benefit of priority of Japanese Patent Application No. 2014-153893, filed on Jul. 29, 2014, the entire contents of which are incorporated herein by reference.

BACKGROUND OF THE INVENTION

1. Field of the Invention

The present invention relates to an optical temperature sensor and a method of controlling the optical temperature sensor.

2. Description of the Related Art

Conventionally, various optical temperature sensors have been proposed. For example, an optical temperature sensor is known that includes a temperature sensing portion that detects a temperature from a change of an energy gap in response to a temperature change. This optical temperature sensor causes a measuring beam emitted from a first light emitting device and a reference beam emitted from a second light emitting device to pass through the temperature sensing portion, and measures an external temperature based on light intensities of reflected light of the measuring beam and reflected light of the reference beam that have passed through the temperature sensing portion.

Japanese Laid-Open Patent Application Publication No. 62-118227 discloses a fiber optic temperature sensor capable of reducing an influence on a temperature measurement value without respect to a variation of the transmitting efficiency of an optical transmission line. Japanese Laid-Open Patent Application Publication No. 6-137965 discloses a method for measuring a temperature by using an optical temperature sensor that can remove a change of a light intensity caused by disturbance from the temperature measurement value.

However, even if the light intensities of the measuring beam and the reference beam that are measured at light emitting parts have no dispersion, light intensities of the measuring beam and the reference beam that are measured at light receiving parts may have dispersion due to an individual difference of the light emitting parts or optical fiber cables. The optical fiber cables lead the measuring beam and the reference beam output from the light emitting parts to the temperature sensing portion, and further lead the measuring beam and the reference beam reflected by the temperature sensing portion to the light receiving parts. When the dispersion causes the light intensities of the measuring beam and the reference beam that are measured at the light receiving parts to be out of a normal range, the measurement accuracy of the temperature decreases.

With respect to this problem, the above technology does not consider how to compensate for the individual difference between parts themselves constituting the temperature sensor or the individual difference caused by a combination of a plurality of parts and to keep the measurement accuracy of the temperature higher than a certain level. For example, the "disturbance" in Japanese Laid-Open Patent Application Publication No. 6-137965 does not include the individual difference of the parts constituting the temperature sensor.

SUMMARY OF THE INVENTION

Accordingly, in response to the above discussed problems, embodiments of the present invention aim to provide an optical temperature sensor and a method for controlling the optical temperature sensor that can appropriately measure a temperature by changing a control target value of a light intensity output from a light emitting source.

According to one embodiment of the present invention, there is provided an optical temperature sensor. The optical temperature sensor includes an light-emitting-side measurement unit configured to measure a first light intensity of a measuring beam output from a first light source and a second light intensity of a reference beam output from a second light source, and a light-receiving-side measurement unit configured to measure a third light intensity of a first reflected light beam of the measuring beam and a fourth light intensity of a second reflected light beam of the reference beam. The first and second reflected light beams are reflected by a temperature sensing unit. The optical control unit further includes a control unit configured to adjust at least one of a first control target value of the first light intensity of the measuring beam and a second control target value of the second light intensity of the reference beam on a light emitting side based on at least one of the third light intensity of the first reflected light beam of the measuring beam and the fourth light intensity of the second reflected light beam of the reference beam that are measured by the light-receiving-side measurement unit. The control unit controls at least one of the first light intensity of the measuring beam output from the first light source and the second light intensity of the reference beam output from the second light source based on the adjusted at least one of the first and second control target values on the light emitting side.

According to another embodiment of the present invention, there is provided a method of controlling an optical sensor. In the method, a first light intensity of a measuring beam output from a first light source and a second light intensity of a reference beam output from a second light source are measured. Next, a third light intensity of a first reflected light beam of the measuring beam and a fourth light intensity of a second reflected light beam of the reference beam are measured. The first and second reflected light beams are reflected by a temperature sensing unit. Further, a control target value of at least one of the first light intensity of the measuring beam and the second light intensity of the reference beam on a light emitting side is adjusted based on at least one of the third light intensity of the first reflected light beam of the measuring beam and the fourth light intensity of the second reflected light beam of the reference beam. Then, at least one of the first light intensity of the measuring beam output from the first light source and the second light intensity of the reference beam output from the second light source is controlled based on the adjusted control target value on the light emitting side.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 7 is a diagram illustrating an example of log information of a light intensity adjustment process according to an embodiment of the present invention.

DETAILED DESCRIPTION OF THE PREFERRED EMBODIMENTS

Figure 1:
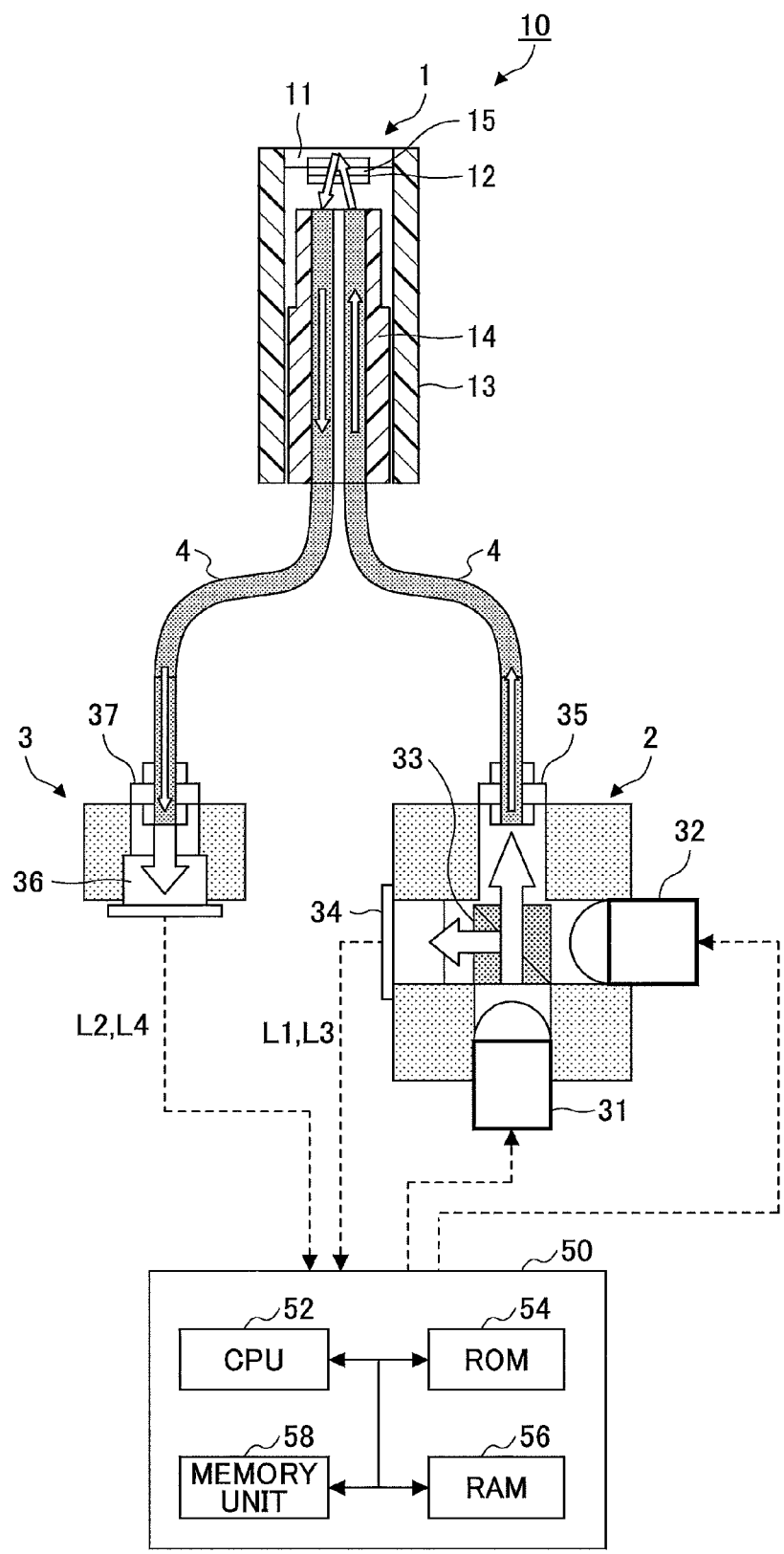
FIG. 1 is a diagram illustrating an optical temperature sensor including a light intensity adjustment function according to an embodiment of the present invention.

A description is given below of embodiments of the present invention, with reference to accompanying drawings. Note that elements having substantially the same configuration may be given the same reference numerals and overlapping descriptions thereof may be omitted.

[Configuration of Optical Temperature Sensor Including Light Intensity Adjustment Function]

To begin with, a description is given below of a configuration of an optical temperature sensor 10 including a light intensity adjustment function according to an embodiment of the present invention, with reference to FIG. 1. The optical temperature sensor 10 is a temperature sensor using an optical fiber cable 4. A chip of a semiconductor compound (i.e., heat sensitive body 12) that changes its optical absorption wavelength depending on its temperature is used as the optical temperature sensor 10. In other words, the optical temperature sensor 10 is a semiconductor adsorption wavelength type temperature sensor that detects a temperature by utilizing the heat sensitive body 12 that changes its transmissive optical adsorption wavelength depending on its temperature. The optical temperature sensor 10 of this embodiment illustrates just one embodiment of the optical temperature sensor including the light intensity adjustment function of the present invention. The optical temperature sensor including the light intensity adjustment function of the present invention may take any configuration as long as the optical temperature sensor can change a value measured by using light into a temperature.

The optical temperature sensor 10 of the embodiment includes a temperature sensing part 1, a light emitting part 2, a light receiving part 3 and optical fiber cables 4. The temperature sensing part 1 is connected to the light emitting part 2 and the light receiving part 3 through the optical fiber cables 4, respectively. Moreover, the optical temperature sensor 10 includes a control unit 50 capable of adjusting a light intensity.

The temperature sensing part 1 includes an aluminum plate for heat transfer 11, a reflection coating 15, the heat sensing body 12, a holding member 13 and a fixing member 14. The heat sensing body 12 is made of a compound semiconductor of gallium arsenic GaAs. The heat sensing body 12 is an example of the temperature sensing portion that changes its optical transmissive properties depending on its temperature. A material constituting the temperature sensing portion is not limited to the compound semiconductor of gallium arsenic GaAs.

The aluminum plate for heat transfer 11 having high thermal conductivity is bonded with an upper surface of the heat sensing body 12, which causes the heat sensing body 12 to be fixed to an inner surface of an apical end of the holding member 13 through the aluminum plate for heat transfer 11. The holding member 13 is hollow, into which the optical fiber cables 4 are inserted. The optical fiber cables 4 inserted into the holding member 13 are fixed inside the holding member 13 by the fixing member 14. The holding member 13 and the fixing member 14 are made of an insulator, and have structures unlikely to transfer the heat from the heat sensing body 12 to the holding member 13 and the optical fiber cables 4. Furthermore, apical surfaces of the optical fiber cables 4 are located in the vicinity of the heat sensing body 12.

The light emitting part 2 includes a measuring LED (Light Emitting Diode) 31, a reference LED 32, a beam splitter 33, a light-emitting-side PD (silicon Photo Diode) 34, and an optical connector 35. The light receiving part 3 includes a light-receiving-side PD (silicon Photo Diode) 36 and an optical connector 36.

The measuring LED 31 outputs a measuring beam having a wavelength of, for example, 890 nm. The measuring LED 31 outputs a beam in a wavelength range where the light intensity passing through the heat sensing body 12 changes depending on a temperature change of the heat sensing body 12. The beam output from the measuring LED 31 is the measuring beam.

The reference LED 32 outputs a reference beam having a wavelength of, for example, 945 nm. The reference LED 32 outputs a beam in a wavelength range where the light intensity passing through the heat sensing body 12 does not change even if the temperature of the heat sensing body 12 changes. The beam output from the reference LED 32 is the reference beam.

The beam splitter 33 disperses the incident measuring beam and reference beam. A beam dispersed by the beam splitter 33 is transferred to the temperature sensing part 1 through the optical fiber cable 4 connected to the optical connector 34, and the other beam enters the light-emitting-side PD 34. The light-emitting-side PD 34 outputs a light intensity L1 of the measuring beam and a light intensity L3 of the reference beam to the control unit 50. Practically, the control unit 50 obtains a current value of a current flowing to the light-emitting-side PD 34 in response to the light intensity L1 of the measuring beam and a current value of a current flowing to the light-emitting-side PD 34 in response to the light intensity L3 of the reference beam.

When a temperature sensing object (not illustrated in the drawings) is in contact with the aluminum plate 11 for heat transfer 11, heat of the temperature sensing object is transferred to the heat sensing body 12 through the aluminum plate for heat transfer 11. The measuring beam from the measuring LED 31 and the reference beam from the reference LED 32 are emitted from the light emitting part 2. The emitted measuring beam and reference beam travel through the optical fiber cable 4, pass through the heat sensing body 12, are reflected by the reflection coating 15 provided between the heat sensing body 12 and the aluminum plate for heat transfer 11, pass through the heat sensing body 12 again, travel through the optical fiber cable 4, and are received by the light receiving part 3.

The light-receiving-side PD 36 receives the reflected light from the temperature sensing part 1 through the optical fiber cable 4 connected to the optical connector 37. The light-receiving-part 36 outputs a light intensity L2 of the reflected light of the measuring beam and a light intensity L4 of the reflected light of the reference beam to the control unit 50. Practically, the control unit 50 obtains a current value of a current flowing to the light-receiving-side PD 36 in response to the light intensity L2 of the reflected light of the measuring beam and a current value of a current flowing to the light-receiving-side PD 36 in response to the light intensity L4 of the reflected light of the reference beam.

Here, the measuring LED 31 is an example of a first light emitting source, and the reference LED 32 is an example of a second light emitting source. The light-emitting-side PD 34 is an example of a light-emitting-side measurement part that measures light intensities of the measuring beam output from the first light emitting source and the reference beam output from the second light emitting source. The light-receiving-side PD 36 is an example of a light-receiving-side measurement part that measures light intensities of the reflected light of the measuring beam and the reflected light of the reference beam that are reflected by the temperature sensing part and received by the light-receiving-side PD 36.

The control unit 50 adjusts an output value (i.e., light intensity) of the measuring LED 31 or the reference LED 32 depending on the reflected light of the measuring beam or the reflected light of the reference beam measured by the light-receiving-side PD 36. The control unit 50 may adjust the light intensity of the measuring LED 31 or the reference LED 32 depending on the measuring beam or the reference beam measured by the light-emitting-side PD 34. The control unit 50 may adjust the output value of the measuring LED 31 or the reference LED 32 so that the output value of the measuring LED 31 or the reference LED 32 does not fall below a predetermined lower limit O1 or O2. The control unit 50 may adjust the output value of the measuring LED 31 or the reference LED 32 based on at least any of the measurement value of the light-receiving-side PD 36, the measurement value of the light-emitting-side PD 34, the measuring LED 31 and the reference LED 32.

The control unit 50 includes a CPU (Central Processing Unit) 52, a ROM (Read Only Memory) 54, a RAM (Random Access Memory) 56, a memory unit 58 such as an HDD (Hard Disk Drive), Flash Memory or the like. The CPU 52 executes processes such as a temperature calculation, a light intensity adjustment and the like in accordance with various data stored in a memory area such as the ROM 54 or the like. Here, a function of the control unit 50 may be implemented by operating while using software or hardware.

As discussed above, the configuration of the optical temperature sensor 10 including the light intensity adjustment function of the embodiment has been described. Next, a description is given below of a temperature calculation process using the optical temperature sensor 10 of the embodiment.

[Temperature Calculation Process]

Figure 2:
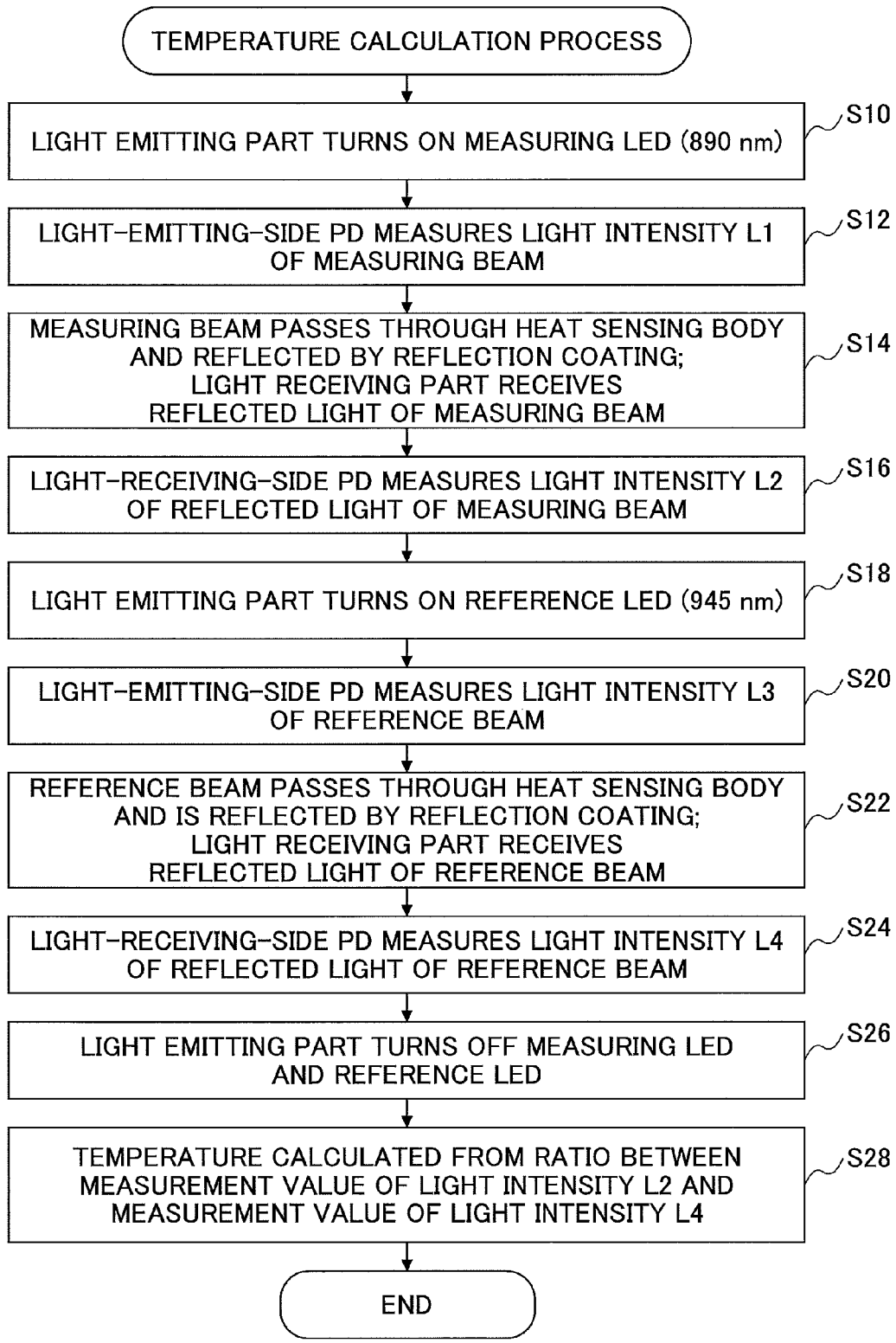
FIG. 2 is a flowchart illustrating a temperature calculation process according to an embodiment of the present invention.

FIG. 2 is a flowchart illustrating a temperature calculation process using the optical temperature sensor 10 of the embodiment. To begin with, the light emitting part 2 turns on the measuring LED 31 (step S10). The measuring LED 31 outputs a measuring beam having a wavelength of, for example, 890 nm. The light-emitting-side PD 34 measures a light intensity L1 of the measuring beam (step S12). The control unit 50 obtains the light intensity L1 (a current value depending thereon).

The measuring beam travels through the optical fiber cable 4, is emitted from an apical surface of the optical fiber cable, and passes through the heat sensing body 12. The measuring beam changes its transmissive light intensity when the temperature of the heat sensing body 12 changes. The measuring light having passed through the heat sensing body 12 is reflected by the reflection coating 15. The light receiving part 3 receives the reflected light of the measuring beam (step S14). The light-receiving-side PD 36 measures a light intensity L2 of the reflected light of the measuring beam (step S16). The control unit 50 obtains the light intensity L2 (a current value depending thereon).

Next, the light emitting part 2 turns on the reference LED 32 (step S18). The reference LED 32 outputs a measuring beam having a wavelength of, for example, 945 nm. The light-emitting-side PD 34 measures a light intensity L3 of the reference beam, and outputs a current value depending on the light intensity L3 (step S20).

The reference beam travels through the optical fiber cable 4, is emitted from the apical surface of the optical fiber cable, and passes through the heat sensing body 12. The reference beam does not change its transmissive light intensity even when the temperature of the heat sensing body 12 changes. The reference beam having passed through the heat sensing body 12 is reflected by the reflection coating 15. The light receiving part 3 receives the reflected light of the reference beam (step S22). The light-receiving-side PD 36 measures a light intensity L4 of the reflected light of the reference beam (step S24). The control unit 50 obtains the light intensity L4 (a current value depending thereon).

Subsequently, the light emitting part 2 turns off the measuring LED 31 and the reference LED 32 (step S26). Next, the control unit 50 obtains a ratio between the light intensity L2 of the reflected light of the measuring beam and the light intensity L4 of the reflected light of the reference beam, and calculates a temperature from the ratio (step S28).

Figure 3:
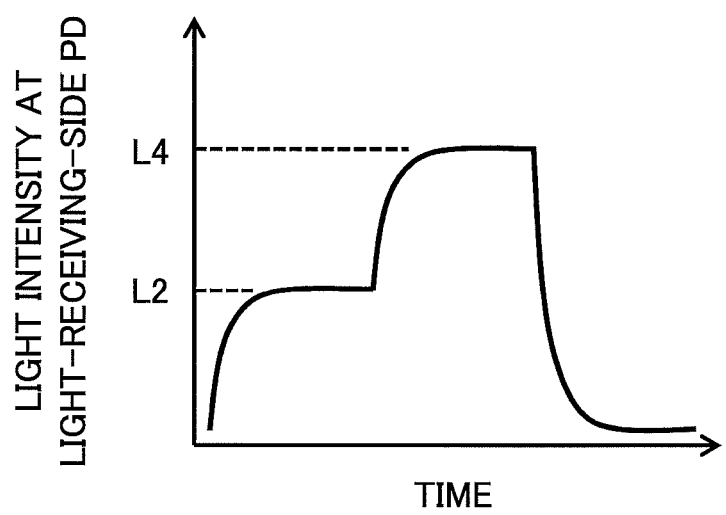
FIG. 3 is a diagram for explaining temperature calculations by an optical temperature sensor according to an embodiment of the present invention.

As discussed above, the temperature calculation process using the optical temperature sensor 10 of the embodiment has been described. According to the optical temperature sensor of the embodiment, as illustrated in FIG. 3, the light intensity L4 of the reflected light of the reference beam passing through the heat sensing body 12 is light of a wavelength that does not change even when the temperature of the heat sensing body 12 (i.e., the temperature of the temperature measuring object) changes as long as there is no disturbance. On the other hand, the light intensity L2 of the reflected light of the measuring beam is light of a wavelength that changes depending on the temperature change of the heat sensing body 12. Hence, the control unit 50 can calculate the temperature of the heat sensing body 12, which is the temperature of the temperature measuring object, by using the ratio between the intensities L2 and L4.

[Light Intensity Adjustment Function Block]

Figure 4:
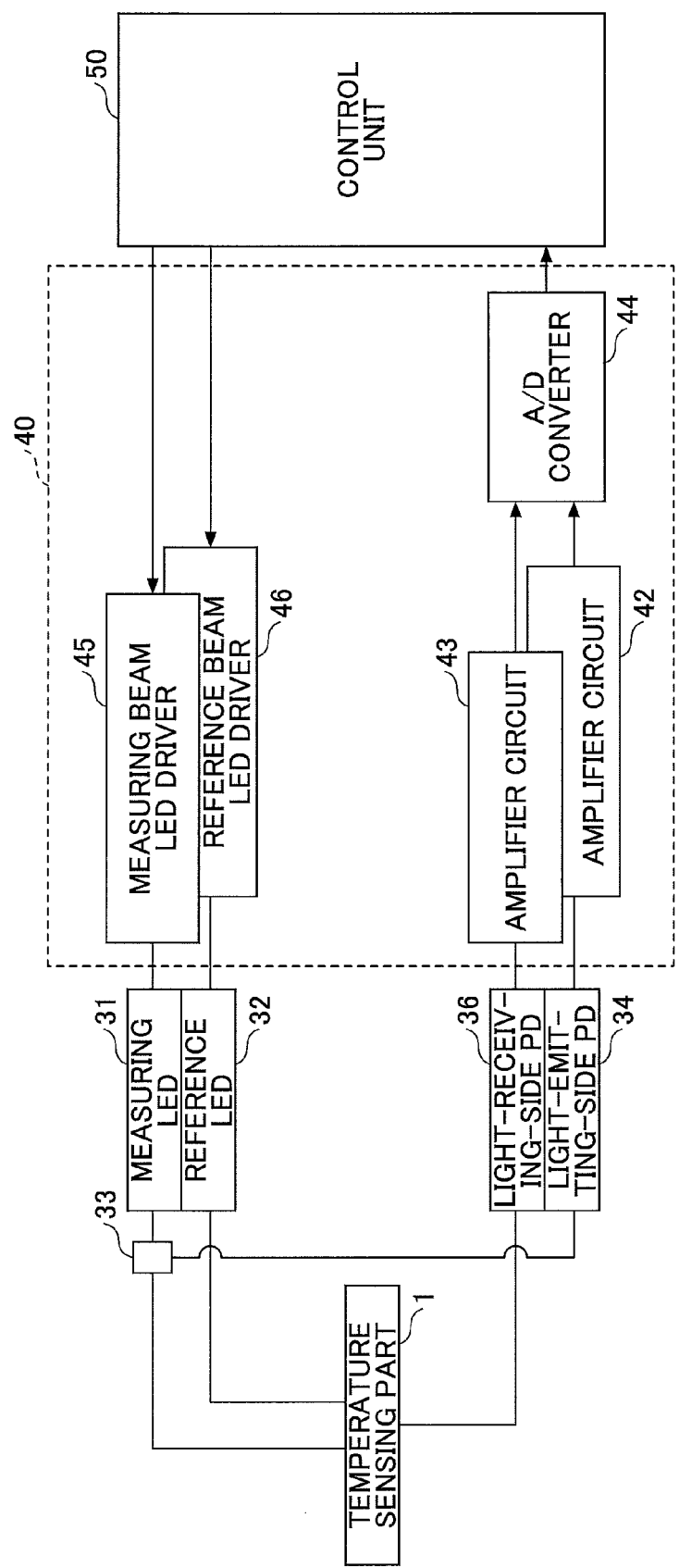
FIG. 4 is a diagram illustrating a light intensity adjustment function block of an optical temperature sensor according to an embodiment of the present invention.

Subsequently, a description is given below of a light intensity adjustment function block of the optical temperature sensor 10 of the embodiment with reference to FIG. 4. The light intensity adjustment function block 40 includes an amplifier circuit 42, an amplifier circuit 43, an A/D converter 44, a measuring beam LED driver 45 and a reference beam LED driver 46, and is connected to the optical temperature sensor 10 and the control unit 50.

The amplifier circuit 42 coverts the current value output from the light-emitting-side PD 34 into a voltage value, and amplifies the converted voltage value. The amplifier circuit 43 coverts the current value output from the light-receiving-side PD 36 into a voltage value, and amplifies the converted voltage value. The A/D converter 44 converts the analog voltage value output from the amplifier circuit 42 into a digital voltage value, and inputs the converted digital voltage value to the control unit 50. This causes the control unit 50 to obtain digital voltage values of the light intensity L1 of the measuring beam and the light intensity L3 of the reference beam that are measured by the light-emitting-side PD 34. In addition, the A/D converter 44 converts the analog voltage value output from the amplifier circuit 43 into a digital voltage value, and inputs the converted digital voltage value to the control unit 50. This causes the control unit 50 to obtain the digital voltage values of the light intensity L2 of the reflected light of the measuring beam and the light intensity L4 of the reflected light of the reference beam that are measured by the light-receiving-side PD 36.

The control unit 50 outputs a control signal for controlling the output value of the measuring LED 31 and the reference LED 32 as a pulse value by using a PWM (Pulse Width Modulation) dimming method.

The measuring beam LED driver 45 controls a current value for flowing through the measuring LED 31 depending on a pulse width of the control signal output from the control unit 50 by feedback. The reference beam LED driver 46 controls a current value for flowing through the reference LED 32 depending on a pulse width of the control signal output from the control unit 50 by feedback. Each of the measuring LED 31 and the reference LED 32 outputs the measuring beam and the reference beam depending on the current value supplied thereto.

The control unit 50 adjusts the output value of the measuring LED 31 and the output value of the reference LED 32. A control target value C1 for the measuring beam to be compared to the light intensity L1 of the measuring beam measured by the light-emitting-side PD 34 and a control target value C3 for the reference beam to be compared to the light intensity L3 measured by the light-emitting-side PD 34 are preliminarily set as control target values on the light emitting side.

The control unit 50 controls the output value of the measuring LED 31 so that the light intensity L1 measured by the light-emitting-PD 34 reaches the preliminarily set control target value C1 on the light emitting side.

Moreover, the control unit controls the output value of the reference LED 32 so that the light intensity L3 measured by the light-emitting-PD 34 reaches the preliminarily set control target value C3 on the light emitting side.

The control target values C1 and C3 on the light emitting side are stored in an internal memory such as the RAM 56, the memory unit 58 or the like. Furthermore, optimum ranges $C1_l$ through $C1_h$ and $C3_l$ through $C3_h$ may be set to the control target values C1 and C3, respectively.

In this case, the control unit 50 controls the output values of the measuring LED 31 and the reference LED 32 so that the light intensities L1 and L3 reach the upper limits of the ranges $C1_l$ through $C1_h$ and $C3_l$ through $C3_h$, respectively.

Here, the control unit 50 may preliminarily set a control target value C2 for the measuring beam to be compared to the light intensity L2 of the reflected light of the measuring beam measured by the light-receiving-side PD 36 and a control target value C4 for the reference beam to be compared to the light intensity L4 of the reflected light of the reference beam measured by the light-receiving-side PD 36, determine whether the light intensity L2 of the reflected light of the measuring beam measured by the light-receiving-side PD 36 is controlled so as to be the preliminarily set control target values on the light receiving side, and change the output value of the measuring LED 31 when the light intensity L2 is out of the control target value C2 on the light receiving side. The control unit 50 may change the output value of the reference LED 32 when the light intensity L4 is out of the control target value C4 on the light receiving side.

As discussed above, the description has been given of the light intensity adjustment function block 40 of the optical temperature sensor 10 according to the embodiment of the present invention. Next, a description is given below of a light intensity adjustment process using the optical temperature sensor 10 including the light intensity adjustment function according to an embodiment.

[Light Intensity Adjustment Process]

Figure 5:
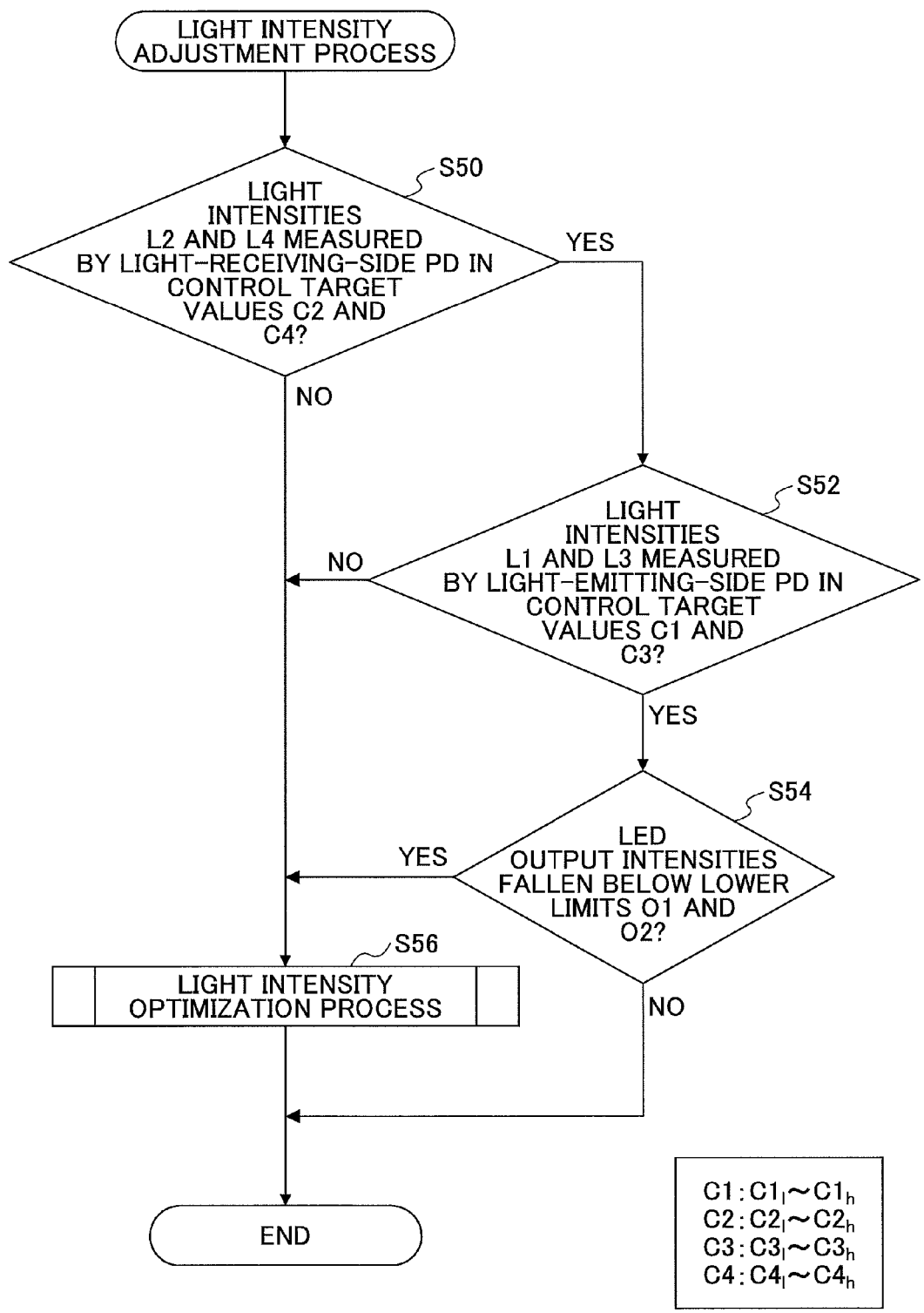
FIG. 5 is a flowchart illustrating a light intensity adjustment process according to an embodiment of the present invention.
Figure 6:
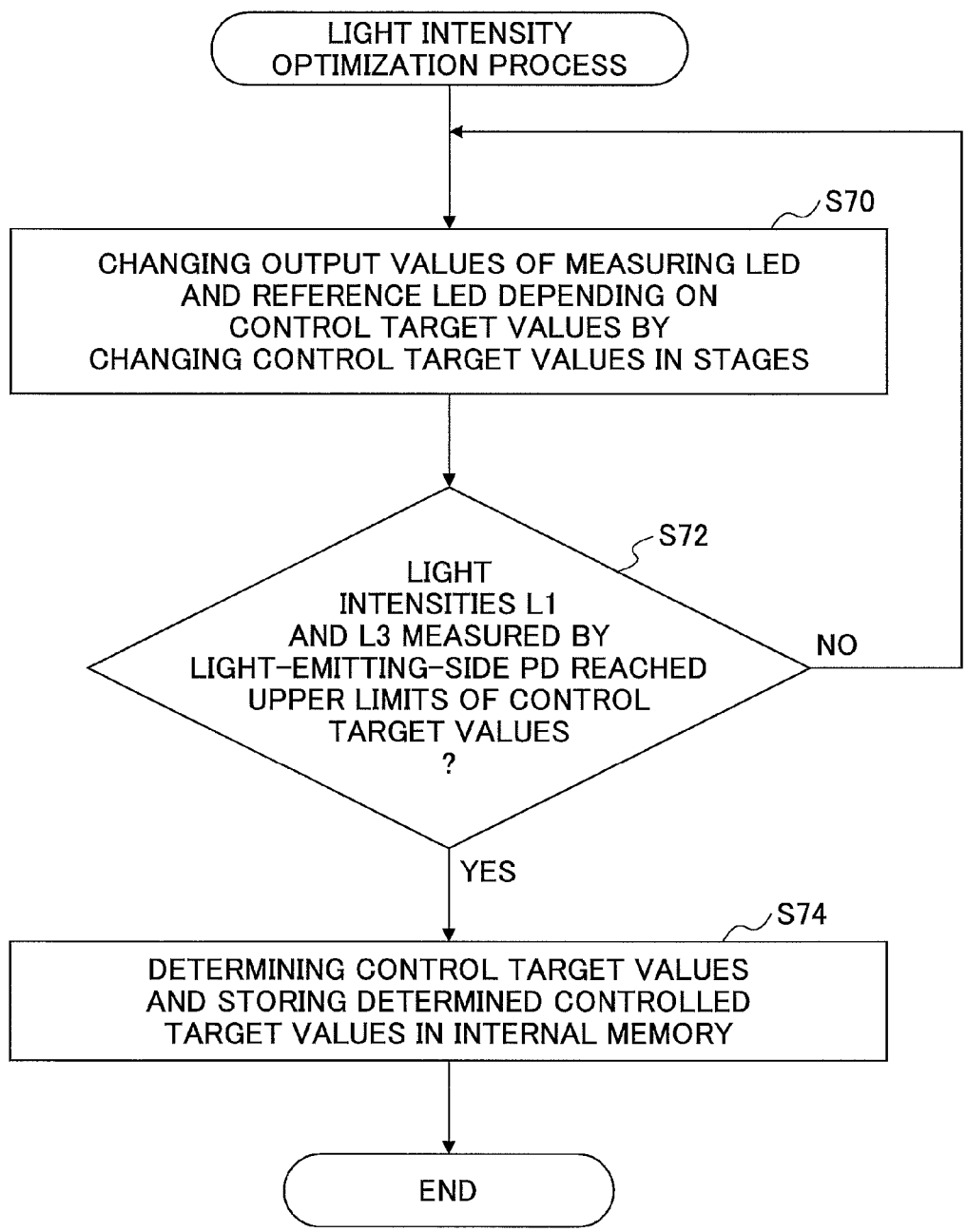
FIG. 6 is a flowchart illustrating a light intensity optimizing process according to an embodiment of the present invention.

FIG. 5 is a flowchart illustrating a light intensity adjustment process according to an embodiment of the present invention. FIG. 6 is a flowchart illustrating a light intensity optimization process called in step S56 of FIG. 5 according to an embodiment of the present invention. The light intensity adjustment process according to the embodiment is performed by using the optical temperature sensor 10 including the light intensity adjustment function as configured above.

(Precondition)

As a precondition of the present process, a light intensity measured by the light-receiving-side PD 36 varies depending on not only the output values of the measuring LED 31 and the reference LED 32 (which are hereinafter called "LED output values" or "LED output intensities") but also a temperature of the heat sensing body 12 (temperature of the temperature measurement object). Thus, the light intensity adjustment process of the embodiment is performed in an environment where a temperature detected by the heat sensing body 12 is constant. On this occasion, the constant temperature detected by the heat sensing body 12 is preferred to be set at a temperature that maximizes the light intensity of the reflected light of the measuring beam and the light intensity of the reflected light of the reference beam.

(Initial Value)

In this state, the control target values C1 and C3 of the light intensity of the light-emitting-side PD 34 and the lower limits O1 and O2 of the output values of the measuring LED 31 and the reference LED 32 are preliminarily set, and stored in the internal memory.

In the light intensity adjustment process of the embodiment, the control target value C1 to be reached by the light intensity L1 measured by the light-emitting-side PD 34 is set in a specific range $C1_l$ through $C1_h$. Moreover, the control target value C3 to be reached by the light intensity L3 measured by the light-emitting-side PD 34 is set in a specific range $C3_l$ through $C3_h$. Furthermore, the control target value C2 to be reached by the light intensity L2 measured by the light-receiving-side PD 36 is set in a specific range $C2_l$ through $C2_h$. In addition, the control target value C4 to be reached by the light intensity L4 measured by the light-receiving-side PD 36 is set in a specific range $C4_l$ through $C4_h$.

FIG. 7 illustrates an example of log information of a light intensity adjustment process according to an embodiment of the present invention. For example, in the log information illustrated in FIG. 7, when the optical temperature sensor 10 begins to operate ("operation of thermometer started"), the output value of the measuring LED 31 (corresponding to a current value Cu1) is controlled to become "29.8" so that the control target value (initial value) C1 of the light intensity L1 of the measuring beam from the light-emitting-side PD 34 becomes "49000". Also, the output value of the reference LED 32 (corresponding to a current value Cu2) is controlled to become "36.6" so that the control target value (initial value) C3 of the light intensity L3 of the measuring beam from the light-emitting-side PD 34 becomes "25000". Here, certain values are preliminarily set at control target values (initial values) C2 and C4 of the light intensity L2 of the measuring beam and the light intensity L4 of the reference beam of the light-receiving-side PD 36, and are stored in the internal memory.

Furthermore, the LED output value of has a proper operating range, and an operating life of the optical temperature sensor 10 shortens when the LED output value is out of the operating range. In addition, the LED output value varies with time. Hence, the LED output values of the measuring LED 31 and the reference LED 32 are controlled so as to output values in a predetermined proper operating range. In particular, the light intensity output from the LED is high as the LED output value is low. Accordingly, the LED output values are controlled so as not to fall below the lower limits O1 and O2 of the proper operating range. On this occasion, when the optical temperature sensor 10 indicates the highest temperature in its measurable temperature range, the light intensities output from the measuring LED 31 and the reference LED 32 are preferred to be set at the lower limits. In the embodiment, the lower limit O1 of the measuring LED 31 is preliminarily set at "10", and the lower limit O2 of the reference LED 32 is preliminarily set at "16".

Then, the light intensity adjustment (adjustment of the output values) of the measuring LED 31 and the reference LED 32 is performed by the following procedures so that each of the measurement value of the light-receiving-side PD 36, the measurement value of the light-emitting-side PD 34 and the output values of the measuring LED 31 and the reference LED 32 meets the range of the optimum value or the condition of the lower limit provided individually.

At the timing of "starting operation of thermometer" illustrated in FIG. 7, the light-emitting-side PD 34 measures a light intensity L1 and a light intensity L3 corresponding to respective output values of the measuring LED 31 and the reference LED 32 for each predetermined period of time. Similarly, the light-receiving-side PD 36 measures the light intensity L2 and the light intensity L4 corresponding to respective output values of the measuring LED 31 and the reference LED 32 for each predetermined period of time. This causes the light intensities L1 through L4 to be stored in the internal memory as log information.

When the light-emitting-side PD 34 and the light-receiving-side PD 36 start taking measurements, the light intensity adjustment process in FIG. 5 starts, and the control unit 50 determines whether the light intensity L2 measured by the light-receiving-side PD 36 is in a range of a control target value C2 ($C2_1$ through $C2_h$) and the light intensity L4 measured by the light-receiving-side PD 36 is in a range of a control target value C4 ($C4_1$ through $C4_h$) at first (step S50).

For example, when the light intensity L2 at the light-receiving-side PD 36 illustrated by log information P in FIG. 7 is out of the range of the control target value C2 ($C2_1$ through $C2_h$) or the light intensity L4 at the light-receiving-side PD 36 illustrated by log information P in FIG. 7 is out of the range of the control target value C4 ($C4_1$ through $C4_h$), the control unit 50 goes to step S56, and ends the present process after performing the light intensity optimization process of FIG. 6.

Log information shown below the log information P of FIG. 7 is history information after starting the light intensity optimization process because the light intensity L2 or the light intensity L4 is out of the range of the control target values C2 ($C2_1$ through $C2_h$) or C4 ($C4_1$ through $C4_h$).

When the light intensity L2 is in the range of control target value C2 ($C2_1$ through $C2_h$) and the light intensity L4 is in the range of the control target value C4 ($C4_1$ through $C4_h$), the control unit 50 determines whether the light intensity L1 measured by the light-emitting-side PD 34 is in a range of a control value C1 ($C1_1$ through $C1_h$) or the light intensity L3 measured by the light-emitting-side PD 34 is in a range of a control value C3 ($C3_1$ through $C3_h$) (step S52). When the light intensity L1 is out of the range of the control target value C1 ($C1_1$ through $C1_h$) or the light intensity L3 is out of the range of the control value C3 ($C3_1$ through $C3_h$), the control unit 50 advances to step S56, and ends the present process after performing the light intensity optimization process of FIG. 6.

When the light intensity L1 is in the range of the control target value C1 ($C1_1$ through $C1_h$) and the light intensity L3 is in the range of the control value C3 ($C3_1$ through $C3_h$), the control unit 50 determines whether the LED output intensities fall below the lower limits O1 and O2 (step S54). For example, when the output value of the measuring LED 31 falls below "10" of the lower limit O1 or the output value of the reference LED 32 falls below "16" of the lower limit O2, the control unit 50 goes to step S56, and ends the present process after performing the light intensity optimization process of FIG. 6. When the LED output intensities is not determined to fall below the lower limits O1 and O2, the present process ends.

(Light Intensity Optimization Process)

In the light intensity optimization process of FIG. 6, the control unit 50 changes the control target values C1 and C3 on the light emitting side in stages, thereby changing the output values of the measuring LED 31 and the reference LED 32 (corresponding to current values Cu1 and Cu2) depending on the control target values C1 and C3 (step S70). Next, the control unit 50 determines whether the light intensity L1 of the measuring beam and the light intensity L3 of the reference beam that are measured by the light-emitting-side PD 34 approach the upper limits of the control target values C1 and C3 (step S72). As the light intensity becomes high, the accuracy of control of the optical temperature sensor 10 becomes high. Thus, the light intensity from the LED passing through the heat sensing body 12 is preferred to be high. Therefore, in step S72, the LED output values are controlled so that the light intensity L1 of the measuring beam and the light intensity L3 of the reference beam reach the upper limits of the control target values C1 and C3, respectively.

When the light intensities L1 and L3 are determined to reach the upper limits of the control target values C1 and C3, the control unit 50 determines the upper limits of the control target values C1 and C3 to be the control target values C1 and C3. The control unit 50 stores the determined control target values C1 and C3 in the internal memory (step S74), and returns to the light intensity adjustment process of FIG. 5.

While the light intensities L1 and L3 are not determined to approach the upper limits of the control target values C1 and C3, the processes of steps S70 and S72 are repeated until the light intensities L1 and L3 become values in a predetermined range from the upper limits of the control target values C1 and C3 and are determined to get closer enough to the control target values C1 and C3.

For example, the control unit 50 changes the control target values C1 and C3 in stages and controls the LED output values depending on the changed control target values C1 and C3. This causes the log information of the light intensity L1 of the measuring beam and the light intensity L3 of the reference beam measured by the light-emitting-side PD 34 to change from a display position of "starting light intensity optimization" of FIG. 7, and as illustrated by log information Q, log information of the light intensity L1 of the measuring beam and the light intensity L3 of the reference beam measured by the light-emitting-side PD 34 can be obtained.

Moreover, in response to this, changes of log information can be found in the light intensity L2 of the reflected light of the measuring beam and the light intensity L4 of the reflected light of the reference beam measured by the light-receiving-side PD 36.

Based on the changing log information, when the output values of the measuring LED 31 and the reference LED 32 become the optimum conditions, the control unit 50 determines the light intensities L1 and L3 of the light-emitting-side PD 34 at that time to be new control target values C1 and C3. In FIG. 7, the new control target values C1 and C3 of the light intensities L1 and L3 of the light-emitting-side PD 34 are determined to be "55000" and "27800". These control target values are stored in the internal memory.

After that, the optical temperature sensor 10 including the light intensity adjustment function is operated based on the new determined control target values C1 through C4. This enables log information after the log information Q of FIG. 7 to be obtained.

Here, in the embodiment, the LED output values are controlled so that the light intensities L1 and L3 measured by the light-emitting-side PD 34 approach the upper limits of the control target values C1 and C3. In contrast, the LED output values may be controlled so that the light intensities L2 and L4 measured by the light-receiving-side PD 36 approach the upper limits of the control target values C1 and C3.

As discussed above, the description has been given of the light intensity adjustment process (light intensity optimization process) of the embodiment. According to the embodiment, when the light intensities measured by the light-receiving-side PD 36 or the light intensities measured by the light-emitting-side PD 34 is out of the predetermined range, the control unit 50 changes the control target values into proper values. This makes it possible to perform a proper temperature measurement by using the optical temperature sensor 10 without being subject to an individual difference caused by the light emitting part 2 or the optical fiber cables 4.

Moreover, when the light intensities measured by the light-receiving-side PD 36 exceed the upper limits of the predetermined range and the light intensities measured by the light-emitting-side PD 34 fall below the lower limits of the predetermined range, the optical temperature sensor 10 can be determined to be out of order. Similarly, when the light intensities measured by the light-receiving-side PD 36 fall below the lower limits of the predetermined range and the light intensities measured by the light-emitting-side PD 34 exceed the upper limits of the predetermined range, the optical temperature sensor 10 can be determined to be out of order.

Here, whether to perform the light intensity optimization process of step S56 may be determined based on the result of the determination process of step S50 in FIG. 5, and the determination processes of steps S52 and S54 may be omitted. However, performing a combination of determination processes of steps S50 and S52 or steps S50 and step S54 is preferable. Furthermore, as illustrated in FIG. 5, performing all of the determination processes of steps S50, S52 and S54 is more preferable.

Although an optical temperature sensor and a method of controlling the optical temperature sensor have been described in the above embodiments, the optical temperature sensor and the method of controlling the optical temperature sensor of the present invention of the present invention are not limited to the embodiments. In this regards, numerous variations and modifications are possible without departing from the scope of the present invention, and may be appropriately determined depending on such variations and modifications that may be made.

An optical temperature sensor and a method of controlling the optical temperature sensor of the present invention can be used in, for example, a capacitively coupled plasma (CCP: Capacitively Coupled Plasma) apparatus, an inductively coupled plasma (ICP: Inductively Coupled Plasma) apparatus, a CVD (Chemical Vapor Deposition) apparatus using a radial line slot antenna, a helicon wave excited plasma (HWP: Helicon Wave Plasma) apparatus, and an electron cyclotron resonance plasma (ECR: Electron Cyclotron Resonance Plasma) apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An optical temperature sensor comprising:
    a light-emitting-side measurement unit configured to measure a first light intensity of a measuring beam output from a first light source before the measuring beam is reflected by a temperature sensing unit and a second light intensity of a reference beam output from a second light source before the reference beam is reflected by the temperature sensing unit;
    a light-receiving-side measurement unit configured to measure a third light intensity of a first reflected light beam of the measuring beam and a fourth light intensity of a second reflected light beam of the reference beam, the first and second reflected light beams being reflected by the temperature sensing unit; and
    a control unit configured to adjust at least one of a first control target value of the first light intensity of the measuring beam and a second control target value of the second light intensity of the reference beam on a light emitting side based on at least one of the third light intensity of the first reflected light beam of the measuring beam and the fourth light intensity of the second reflected light beam of the reference beam that are measured by the light-receiving-side measurement unit and to control at least one of the first light intensity of the measuring beam output from the first light source and the second light intensity of the reference beam output from the second light source based on the adjusted at least one of the first and second control target values on the light emitting side.

2. A optical temperature sensor comprising:
    a light-emitting-side measurement unit configured to measure a first light intensity of a measuring beam output from a first light source and a second light intensity of a reference beam output from a second light source;
    a light-receiving-side measurement unit configured to measure a third light intensity of a first reflected light beam of the measuring beam and a fourth light intensity of a second reflected light beam of the reference beam, the first and second reflected light beams being reflected by a temperature sensing unit; and a control unit configured to adjust at least one of a first control target value of the first light intensity of the measuring beam and a second control target value of the second light intensity of the reference beam on a light emitting side based on at least one of the third light intensity of the first reflected light beam of the measuring beam and the fourth light intensity of the second reflected light beam of the reference beam that are measured by the light-receiving-side measurement unit and to control at least one of the first light intensity of the measuring beam output from the first light source and the second light intensity of the reference beam output from the second light source based on the adjusted at least one of the first and second control target values on the light emitting side, wherein the control unit is configured to control the first light intensity of the measuring beam output from the first light source and the second light intensity of the reference beam output from the second light source upon determining that at least one of the third light intensity of the first reflected light beam of the measuring beam and the fourth light intensity of the second reflected light beam of the reference beam is not a predetermined light-receiving-side control target values.

3. The optical temperature sensor as claimed in claim 1, wherein the control unit is configured to adjust at least one of the first control target value of the first light intensity of the measuring beam and the second control target value of the second light intensity of the reference beam on the light emitting side based on at least one of the first light intensity of the measuring beam and the second light intensity of the reference beam that are measured by the light-emitting-side measurement unit and to control at least one of the first light intensity of the measuring beam output from the first light source and the second light intensity of the reference beam output from the second light source based on the adjusted at least one of the first and second control target values on the light emitting side.

4. The optical temperature sensor as claimed in claim 3, wherein the control unit is configured to control the at least one of the first light intensity of the measuring beam output from the first light source and the second light intensity of the reference beam output from the second light source upon determining that the at least one of the first light intensity of the measuring beam and the second light intensity of the reference beam is not the first and second control target values on the light emitting side.

5. The optical temperature sensor as claimed in claim 1, where the first and second control values have first and second ranges, respectively, and the control unit is configured to adjust a first output value of the first light source and a second output value of the second light source so that the first light intensity of the measuring beam and the second light intensity of the reference beam that are measured by the light-emitting-side measurement unit reach first and second upper limits of the first and second ranges, respectively.

6. The optical temperature sensor as claimed in claim 1, wherein the control unit is configured to adjust, upon determining that at least one of the first output value of the first light source and the second output value of the second light source falls below a predetermined lower limit, the at least one of the first output value of the first light source and the second output value of the second light source determined to fall below the predetermined lower limit.

7. The optical temperature sensor as claimed in claim 1, wherein the control unit is configured to adjust the first light intensity of the measuring beam output from the first light source and the second light intensity of the reference beam output from the second light source in an environment having a substantially constant temperature detected by the temperature sensing unit.

8. The optical temperature sensor as claimed in claim 7, wherein the substantially constant temperature detected by the temperature sensing unit is a predetermined temperature maximizing the third light intensity of the first reflected light beam of the measuring beam and the fourth light intensity of the second reflected light beam of the reference beam or a temperature close to the predetermined temperature.

9. The optical temperature sensor as claimed in claim 6, wherein the first and second control target values on the light emitting side and the predetermined lower limit of the output value of the at least one of the first and second light sources, are stored in an internal memory of the control unit.

10. A method of controlling an optical sensor, the method comprising steps of:

measuring a first light intensity of a measuring beam output from a first light source before the measuring beam is reflected by a temperature sensing unit and a second light intensity of a reference beam output from a second light source before the reference beam is reflected by the temperature sensing unit;

measuring a third light intensity of a first reflected light beam of the measuring beam and a fourth light intensity of a second reflected light beam of the reference beam, the first and second reflected light beams being reflected by the temperature sensing unit;

adjusting a control target value of at least one of the first light intensity of the measuring beam and the second light intensity of the reference beam on a light emitting side based on at least one of the third light intensity of the first reflected light beam of the measuring beam and the fourth light intensity of the second reflected light beam of the reference beam; and controlling at least one of the first light intensity of the measuring beam output from the first light source and the second light intensity of the reference beam output from the second light source based on the adjusted control target value on the light emitting side.

* * * * *